US012706821B2

(12) United States Patent
Cunningham et al.

(10) Patent No.: US 12,706,821 B2
(45) **Date of Patent: *Aug. 11, 2026**

(54) OPTIMIZED DATA STREAMING DETECTION AND PRIORITIZATION

(71) Applicant: Connectify, Inc., Philadelphia, PA (US)

(72) Inventors: Kevin Cunningham, Swarthmore, PA (US); Harry Volek, Philadelphia, PA (US); Alexander Gizis, Philadelphia, PA (US); Brian Prodoehl, Plymouth Meeting, PA (US)

(73) Assignee: Connectify, Inc., Philadelphia, PA (US)

( * ) Notice: Subject to any disclaimer, the term of this patent is extended or adjusted under 35 U.S.C. 154(b) by 32 days.

This patent is subject to a terminal disclaimer.

(21) Appl. No.: 18/795,665

(22) Filed: Aug. 6, 2024

(65) Prior Publication Data

US 2024/0396815 A1 Nov. 28, 2024

Related U.S. Application Data

(63) Continuation of application No. 17/356,184, filed on Jun. 23, 2021, now Pat. No. 12,088,482.

(60) Provisional application No. 63/042,849, filed on Jun. 23, 2020.

(51) Int. Cl.

| | |
|---|---|
| ***H04L 43/062*** | (2022.01) |
| ***H04L 12/46*** | (2006.01) |
| ***H04L 43/0829*** | (2022.01) |
| ***H04L 43/0894*** | (2022.01) |
| ***H04L 43/16*** | (2022.01) |
| ***H04L 65/70*** | (2022.01) |
| ***H04L 69/22*** | (2022.01) |

(52) U.S. Cl.

CPC ........ *H04L 43/062* (2013.01); *H04L 12/4641* (2013.01); *H04L 43/0829* (2013.01); *H04L 43/0894* (2013.01); *H04L 43/16* (2013.01); *H04L 65/70* (2022.05); *H04L 69/22* (2013.01)

(58) Field of Classification Search

CPC ............. H04L 43/0829; H04L 43/0894; H04L 43/062; H04L 43/16; H04L 65/70; H04L 65/60; H04L 69/22

See application file for complete search history.

(56) References Cited

U.S. PATENT DOCUMENTS

2006/0165087 A1 7/2006 Page et al.
2013/0212166 A1 8/2013 Willig et al.
2014/0040442 A1* 2/2014 Saavedra .............. H04L 45/245 709/221

(Continued)

*Primary Examiner* — Nam T Tran
(74) *Attorney, Agent, or Firm* — Kamran Emdadi

(57) ABSTRACT

An example method may include determining a transmission rate for streaming session data packets, prioritizing a first plurality of data packets identified as the streaming session data packets, to be delivered to a client device prior to a second plurality of data packets, identified as non-streaming session data packets, measuring a transmission rate of data streamed to the client device, performing connection bonding using two or more connections when the measured transmission rate is below the transmission rate, increasing the transmission rate of the first plurality of packets to a faster transmission rate on the bonded connections for a period of time, and reducing the transmission rate of one of the two or more connections when a packet loss rate is below a threshold packet loss rate.

20 Claims, 5 Drawing Sheets

(56) References Cited

U.S. PATENT DOCUMENTS

2014/0192710 A1* 7/2014 Charette ................. H04L 45/22 370/328
2015/0223098 A1* 8/2015 Sze ..................... H04L 43/0829 370/235
2015/0245409 A1* 8/2015 Medapalli ............. H04W 76/20 370/329
2016/0050241 A1 2/2016 Lotfallah et al.
2018/0198838 A1* 7/2018 Murgia ................... H04L 65/61
2018/0270347 A1 9/2018 Rangarajan et al.
2019/0373526 A1* 12/2019 Chow ..................... H04L 45/22

* cited by examiner

OPTIMIZED DATA STREAMING DETECTION AND PRIORITIZATION

BACKGROUND

In some forms of video transmission, one or two minutes of video data is downloaded, and then video transmission stops until most of the downloaded video has been consumed on a client device. YouTube is one example of short spurts of video data being transferred to client devices. Netflix, as well, transmits "bursts" of one or two minutes of data until the related video has been consumed. But in other forms of video transmission, data streaming occurs for longer periods of time. In a video call, for example, the transmission of video is continuous, and the transmission occurs for as long as the video call lasts. Live sports is another form of lengthy video streaming, because the data transmission occurs in real time, and users desire to continuously watch events as they occur.

In some forms of data transmission, the end user may not care if delays occur. An example of such a situation is the loading of a webpage over the Internet from a content server. Because many pages of web content downloaded from the Internet are static in nature, a user may be able to tolerate one or more short download delays, each lasting a few seconds. Eventually, after several seconds, an entire webpage has been downloaded and the user is ready to begin reading the webpage's content.

The user experience when streaming audio and/or video, however, radically differs from a static webpage download. When a user is engaged in a video call or watching live sports, one or more seconds of delay at multiple times can effectively ruin the user experience. Users are accustomed to participating in video calls and watching live sports without technical "hiccups." Any interruption to the streaming of data in such situations, even for only a second, can be unacceptable.

There are various causes of delay during a streaming data transmission. Some forms of delay are out of the control of the user that is receiving the data stream. For example, the delay may be caused by the server that is the source of the streaming data. The server may be overloaded and may not be transmitting data in a uniform manner. Another form of delay is network congestion. In this form of delay, one or more sections of the pathway between the streaming data source and the endpoint user device are overloaded. In these exemplary conditions, unless the user can select a different pathway (or portion thereof) over which to receive data, the user has no control over the cause of the congestion.

While the use of a LAN may be preferred in some situations, it is optional. LAN 120 is illustrated in FIG. 1 and may be a local area network that is accessed via a router (not shown). The local area network may provide, for example, Wi-Fi and Ethernet connections. In other situations, LAN 120 may be a public Wi-Fi system that client 110 accesses in an airport or retail store or any environment. In a further exemplary embodiment, LAN 120 is omitted and client 110 accesses ISP 130 via a cellular signal. The various types of communication protocols described above are merely exemplary, as possible communication protocols include Ethernet, Wi-Fi, WiMAX, satellite, cellular, etc.

In operation, client (device) 110 communicates over Internet 140 with multiple servers, including server 150 and server 160. Server 150 may provide client 110 with streaming content while server 160 may provide client 110 with non-streaming content, such as the download of a static webpage. Client 110 transmits requests for data from server 150 and server 160 via optional LAN 120, ISP 130 and over the Internet 140. Server 150 and Server 160 each respond to data requests via Internet 140. The client device 110 may be operating one or more applications 112 communicating with a VPN client 118, which includes an encapsulation/decapsulation module 114 for processing incoming and outgoing packets and a driver receiver 114 for managing communications to and from the client device 100.

SUMMARY

When data is transferred to a client device or simply 'client' for convenience. The data may be transferred on a Virtual Private Network (VPN). The data includes a first plurality of data packets and a second plurality of data packets. The first plurality of data packets that are targeted for the client are received. The second plurality of data packets that are targeted for the client are also received. The first plurality of data packets are prioritized over the second plurality of data packets for delivery to the client. The prioritization may be based upon a determination that the first plurality of data packets are streaming data. One manner of making that determination is based upon an analysis of data in a header of the first plurality of data. Another manner of making the prioritization determination is based on whether the amount of data transmitted for the first plurality of data packets over multiple time periods is equal or within a range.

The rate at which data is transmitted over a connection is determined. This may be the rate at which data is received over a connection. That rate is compared to a desirable rate at which the data is transmitted over a connection. That desirable rate may be experimentally obtained. That desirable rate may be based on the type of data that is transmitted over the connection. If the actual rate of data transmission over a connection is lower than a desirable rate for that data transmission, the connection is bonded to another connection to create a bonded connection. In this manner, greater bandwidth is available for the data transmission. In this way, the data transmission rate can be increased so that it occurs at the desirable rate.

Alternatively, or in addition, an amount of packets of the first plurality of packets that are dropped on the connection (and/or the further connection if the further connection exists) are measured. If the amount of dropped packets reaches or exceeds a threshold, ones of the first plurality of data packets are transmitted redundantly on two connections (e.g. on the connection and the further connection). This may be referred to as a mirrored connection. In some embodiments, the threshold is zero. In other embodiments the threshold is greater than zero.

One example embodiment may include receiving a first plurality of data packets intended for a client device at a virtual private network (VPN) server, receiving, concurrently with the first plurality of data packets, a second plurality of data packets at the VPN server, identifying, via the VPN server, whether the first or second plurality of packets correspond to a real-time streaming session based on one or more of header information and packet size of the first and second plurality of packets and a transmission rate associated with the first and second plurality of packets, prioritizing the first plurality of data packets, identified as real-time streaming session data packets, to be delivered to the client device prior to the second plurality of data packets, identified as non-real-time streaming session data packets, and performing connection bonding or connection mirroring using two or more connections when one or more of a data packet loss rate is above a threshold packet loss rate and the transmission rate is below a threshold transmission rate.

Another example embodiment may include populating a table stored in memory with streaming server identification information identifying a plurality of streaming servers, and comparing the header information of the first and second plurality of data packets to the streaming server identification information stored in the table to identify whether the first and second plurality of packets originated from one or more of the plurality of data streaming servers, wherein the transmitting the first plurality of data packets to the client device using the transmission rate is performed via the virtual private network (VPN) server, and wherein the table is stored in the memory of the VPN server or the client device.

Still another example embodiment may include a virtual private network (VPN) server including a receiver configured to receive a first plurality of data packets intended for a client device, receive, concurrently with the first plurality of data packets, a second plurality of data packets, and a processor configured to identify whether the first or second plurality of packets correspond to a real-time streaming session based on one or more of header information and packet size of the first and second plurality of packets and a transmission rate associated with the first and second plurality of packets, prioritize the first plurality of data packets, identified as real-time streaming session data packets, to be delivered to the client device prior to the second plurality of data packets, identified as non-real-time streaming session data packets, and perform connection bonding or connection mirroring using two or more connections when one or more of a data packet loss rate is above a threshold packet loss rate and the transmission rate is below a threshold transmission rate.

Still yet another example embodiment may include a non-transitory computer readable storage medium configured to store instructions that when executed cause a processor to perform receiving a first plurality of data packets intended for a client device at a virtual private network (VPN) server, receiving, concurrently with the first plurality of data packets, a second plurality of data packets at the VPN server, identifying, via the VPN server, whether the first or second plurality of packets correspond to a real-time streaming session based on one or more of header information and packet size of the first and second plurality of packets and a transmission rate associated with the first and second plurality of packets, prioritizing the first plurality of data packets, identified as real-time streaming session data packets, to be delivered to the client device prior to the second plurality of data packets, identified as non-real-time streaming session data packets, and performing connection bonding or connection mirroring using two or more connections when one or more of a data packet loss rate is above a threshold packet loss rate and the transmission rate is below a threshold transmission rate.

Another example embodiment may include determining a transmission rate for streaming session data packets, prioritizing a first plurality of data packets identified as the streaming session data packets, to be delivered to a client device prior to a second plurality of data packets, identified as non-streaming session data packets, measuring a transmission rate of data streamed to the client device, performing connection bonding using two or more connections when the measured transmission rate is below the transmission rate, increasing the transmission rate of the first plurality of packets to a faster transmission rate on the bonded connections for a period of time, and reducing the transmission rate of one of the two or more connections when a packet loss rate is below a threshold packet loss rate.

DETAILED DESCRIPTION

While some causes of data streaming delay are out of the control of the end user device, in other situations, the end user device may be able to initiate certain actions in order to decrease or remove data streaming delay. For example, if the server that is the source of the data streaming has delays, the user device is typically not in a situation to remedy a data delay. As another example, if there is a bottleneck between the server that is the source of the streaming data and the Internet, the user device may be unable to remedy that situation, however, certain actions may be performed, such as signaling the server to modify its manner of communication with the Internet, if the server is able to respond to such signaling. On the other hand, in some situations, the user may be able to initiate certain actions that will decrease or remove delays with receiving and sending streaming data. One example of such a situation is when the delays are occurring in the end-user device. Thus, in some situations, the user device can initiate actions to modify how the end-user device processes data so that there are no delays (or fewer delays) in the streaming data that is output to the user device. In another situation, there may be bottlenecks along the pathway of the streaming data to the user device that the user device can control. Thus, in some situations, the user device can modify the pathway, or add additional pathways, so that a delay of the streaming data is lessened or eliminated. In other situations, the user device can modify the pathway, or add additional pathways in order to achieve other objectives, such as increased available bandwidth, lower latency, lower jitter, lower error rate, etc. In other situations, more than one of the above objectives are achieved.

Figure 1:
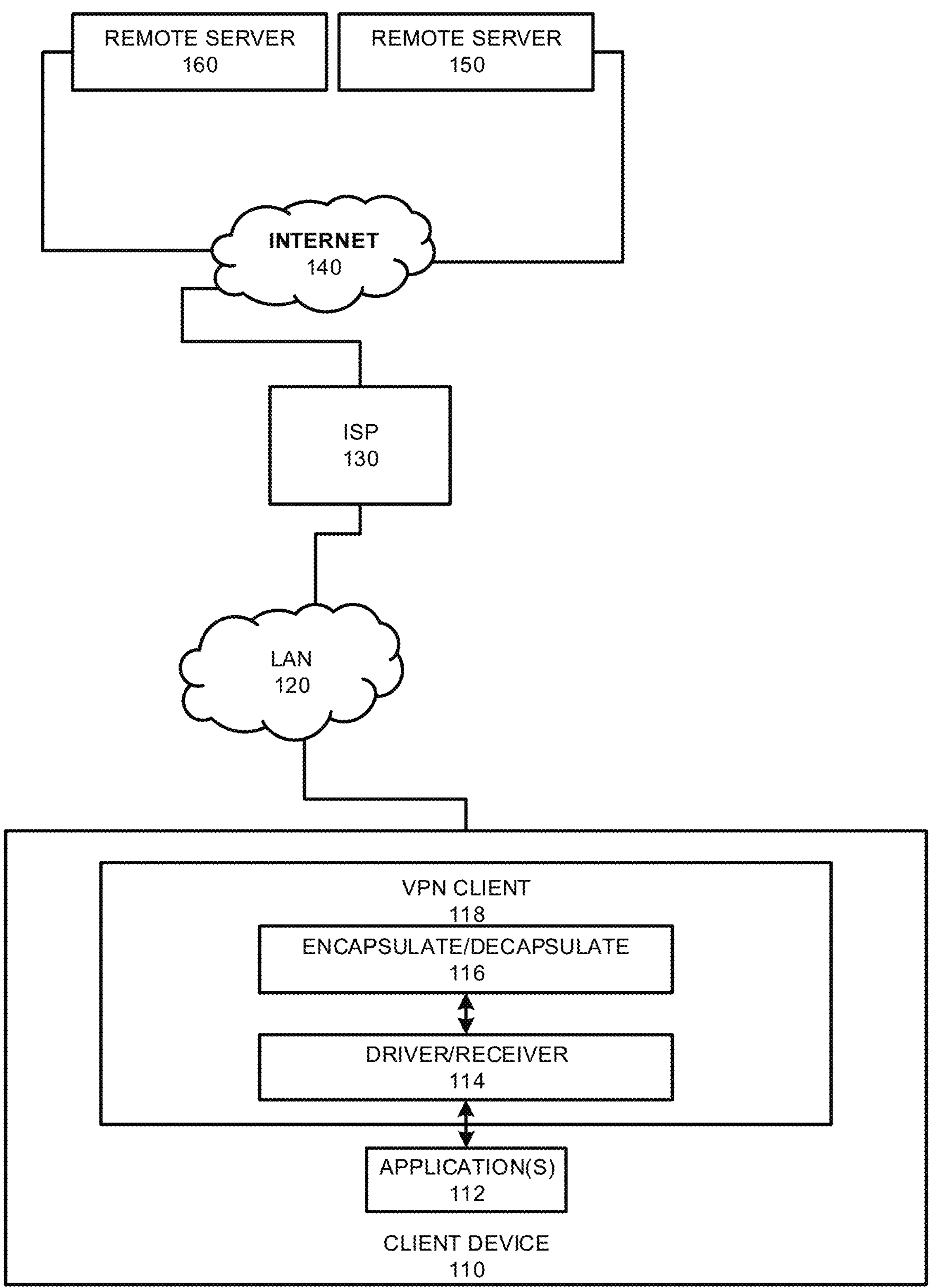
FIG. 1 is a block diagram that illustrates a client device communicating with multiple servers in accordance with the prior art.
Figure 2:
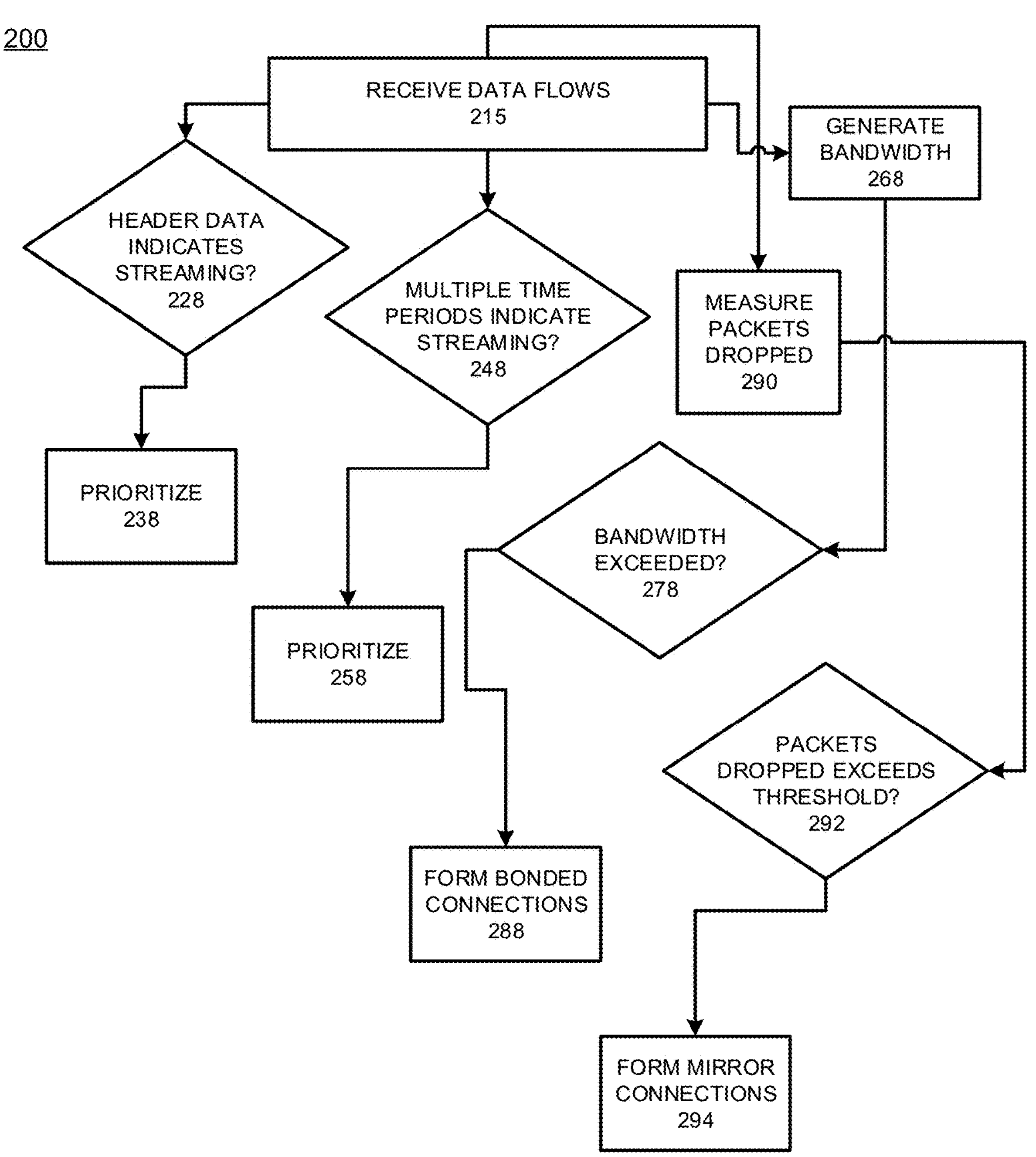
FIG. 2 is a flowchart diagram that illustrates exemplary operation of processing various data flows according to example embodiments of the present invention.

FIG. 2 is a flowchart diagram that illustrates operation of one or more exemplary embodiments of the present invention. In particular, FIG. 2 illustrates four conditional operations: 228, 248, 268, and 290. In one exemplary embodiment, all four of these conditional operations are performed. In a further embodiment, less than all of these conditional operations are performed. In a further embodiment, the four (or less) conditional operations are performed in parallel. In a further embodiment, the four (or less) conditional operations are partially performed in parallel and partially performed in serial. In a further exemplary embodiment, the four conditional operations are performed in serial. The conditional operations may be performed at any time relative to each other in any sequence. Additional conditional operations may be performed in parallel, serial, or partially parallel and partially serial.

Figure 3:
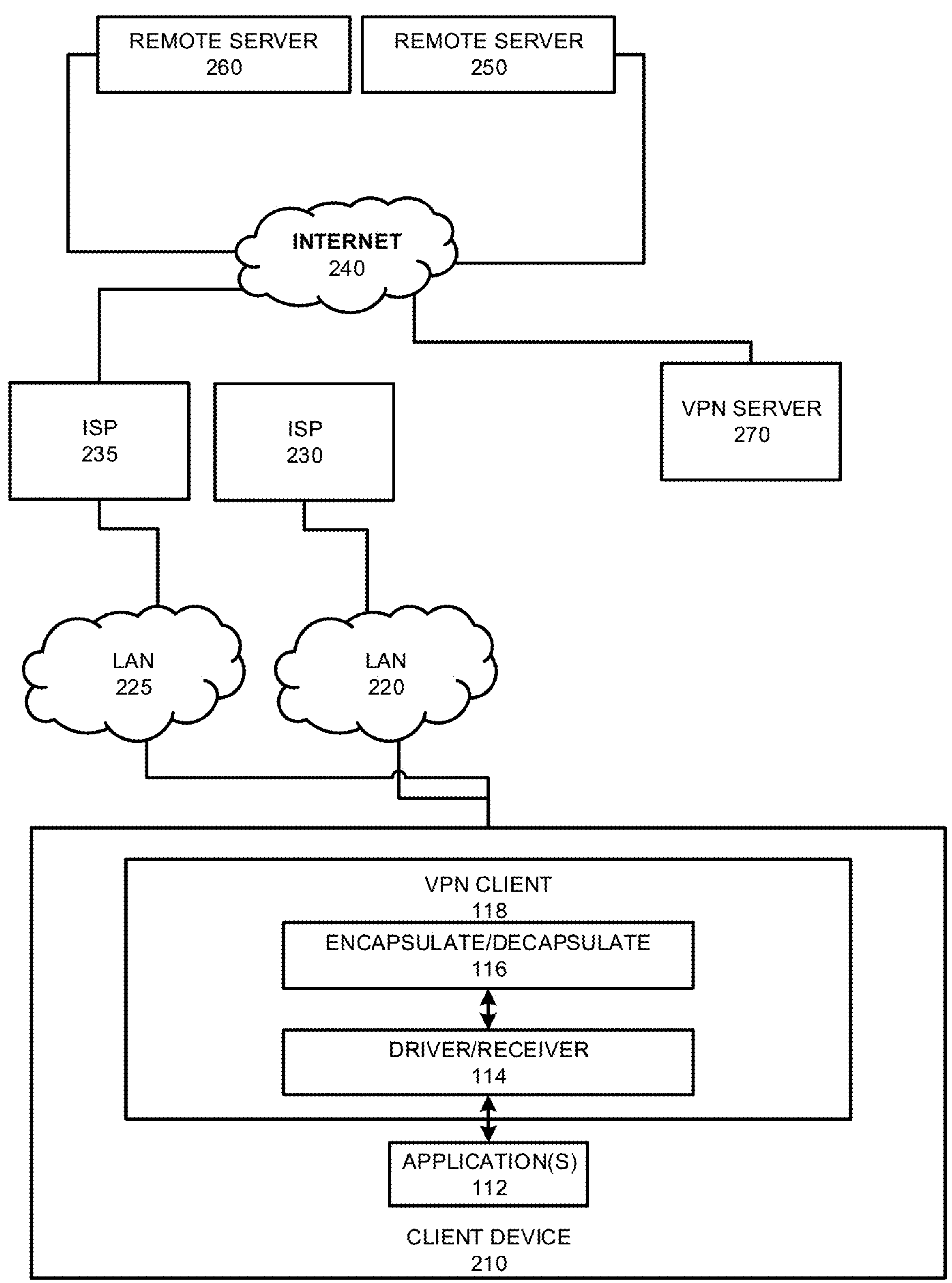
FIG. 3 is a block diagram that illustrates exemplary operation of multiple connections used for transmitting data to the client according to example embodiments of the present invention.

In one exemplary embodiment, some or all of the operations illustrated in FIG. 2 may be performed on a system configuration as illustrated in FIG. 3. The example in FIG. 3 illustrates optional multiple connections between VPN server 270 and Internet 240. FIG. 3 also illustrates optional multiple connections between Internet 240 and client 210. FIG. 3 also illustrates optional multiple connections between ISP 230 and LAN 220, and/or between ISP 230 and Internet 240.

In some embodiments, use of multiple connections is unnecessary. In other embodiments, the streaming data transmitted from server 250 to client 210 is subject to delay when there is insufficient bandwidth at one or more locations along the path between server 250 and client 210. Each of these examples is discussed below.

Returning to FIG. 2, at operation 215 data flows are received. The data flows are transmitted from a server such as server 250 and/or server 260 and may be received by client device 210. Alternatively, the data flows may be received by optional VPN server 270 before the data flows are retransmitted to client 210. The data flows may be transmitted from a server at the request of client 210.

The data flows that are received at operation 215 may be a combination of data flows. One exemplary data flow may be streaming data from server 250. Another exemplary data flow may be non-streaming data from server 260. A server may transmit streaming and/or non-streaming data.

At operation 228, a determination is made as to whether any data that is received by client 210 is streaming data. This determination is made so that the transmission, receipt, and/or processing of streaming data is prioritized over the transmission, receipt, and/or processing of non-streaming data. By prioritizing streaming data over non-streaming data, the number of delays in the output of the streaming data by client 110 decreases (and may, for example, reach minimal or no delay). For example, if non-streaming data uses certain system resources which are necessary to ensure the streaming data is received and processed optimally, then the reception of streaming data is prioritized over non-streaming data resource requests so that output delays of the streaming data desirably do not occur (or are reduced).

In order to prioritize streaming data over non-streaming data, it is desirable to identify streaming data. In accordance with exemplary embodiments of the present invention, various strategies may be used determine whether data that has been or will be received is streaming data or is other types of data.

One objective of an exemplary embodiment may be to reduce and/or minimize delay (or intermittent delay) when streaming data is received by client. Delay is a relative term as all computer systems have delay (propagation delay within hardware, transmission delay, clock speed, etc.). Therefore, one goal of the present invention is to reduce delay, and/or to reduce delay by a particular amount. If delay is sufficiently reduced, then a user device is able to process streaming data without unnecessary delays and the user's experience is optimal. If delay is too great (for example, above a threshold), then the user experience could be potentially a poor experience.

For example, in FIG. 2, operation 228, header data is evaluated to determine whether data is streaming data. In one example, certain ports are known to be used for certain exemplary forms of streaming data. Thus, by evaluating packet headers of packets received from (or destined to) a server, if a port number is identified that is normally associated with streaming data (or associated with a request for streaming data), then an assumption is made that the data received from the server (or requested to be received from the server) is indeed streaming data. In another example, certain domain names or IP addresses are known to be associated with streaming data. Thus, if a packet header indicates an IP address that is associated with a known source of streaming data (requesting or receiving streaming data), then the received packets are assumed to be streaming data. In another example, if client 110 makes a request from a server with a domain name that is known to respond with streaming data (i.e. to transmit streaming data to client 110), the domain name can be noted when client 110 makes the DNS request, and when the DNS request is resolved, the IP address corresponding to the domain name in the DNS request may then be stored in a local table, along with the domain name that corresponds to the IP address. When a subsequent data fetch occurs at the IP address that was returned from the DNS request, the data that is returned from that IP address is assumed to be streaming data since the previous data exchange was identified as streaming data.

In the examples above, a table may be maintained within client 210 in which there is stored data to determine whether received data is streaming data. In accordance with the above examples, entries to such a table may include port number, domain names, IP addresses, and/or other information included in packet headers. Other data indicative of streaming data may also be stored in such a table. The table may be accessed when client 210 requests the data and/or when server(s) 250, 260 respond with data. The purpose of accessing the table is to determine whether the data is coming from (or is requested to come from) a source of streaming data (and therefore the data itself is streaming data).

Thus, information in packet headers (packet headers of data requests and/or packet headers of received data) may be used to identify that received data is streaming data.

Once received data is identified as streaming data, the streaming data is prioritized over non-streaming data at operation 238.

The above operations may be performed in various locations within system network configuration 200. For example, the above operations may be performed by optional VPN server 270. Alternatively, the above operations may be performed by client 210. The above operations may be performed by an intermediate server (not shown) or at some other intermediate location within system 200 as well. In one example, the packets are audited for header data analysis early in the packet receiving or sending cycle and then presumed to be streaming data for the remaining duration of the data exchange cycle. For example, a first, second, third, etc., packet may be identified, the header may be identified and compared to the table data for a certain predefined number of packets and then the packet analysis may cease for a remainder of the data exchange. Once the data is identified as being streaming or non-streaming data packets, the resources may be used to accommodate the remaining data as streaming or non-streaming. For example, the first two or three, or 'n' packets may be examined for header information indicative of streaming data. A positive outcome determining that the data is streaming can be based on a known domain, IP address, port, etc., which match information in the packet header table, then the remaining packets may be received based on a network accommodation used for streaming data (e.g., priority, additional channels, etc.). After a period of time, additional packet audit processes may be performed to ensure the data is still streaming data. At some point, the process may restart to test packets for streaming header characteristics prior to ending the audit again for a period of time. In a further exemplary embodiment of the present invention, data patterns are used to determine whether received data is streaming data. This task may be accomplished by measuring the amount of data (i.e. amount of bits, amount of bytes, amount of packets, etc.) that are received from server 150 during multiple time periods. In one embodiment, if the amount of data received from server 150 in multiple time periods is the same (or the same within a window that is fixed or variable), then it is assumed that the received data is streaming data. Alternatively, a data threshold is established. This threshold accounts for small variations in the amount of data received from server 150 during multiple time periods. If the amount of data received from server 150 during multiple time periods is within a range established by the data threshold, then the data received from server 150 is assumed to be streaming data.

If at operation 248, the data received from server 150 is determined to be streaming data, then at operation 258 the data received from server 150 is prioritized over data received from server 160. The time periods may be used as windows to examine the data packets individually and/or to determine a total amount of data received over a period of time. The amount of data received over a particular time period may be measure as a whole to identify whether streaming data packets are likely the type of packet received over that particular time window. The process may begin analyzing data over another time window to repeat the process.

When data is prioritized this may refer to data being processed by hardware and/or software before non-prioritized data is processed. This may also or alternately refer to data being processed more frequently or for greater time periods than non-prioritized data. The prioritization may occur for any period of time, for recurring periods of time, etc. Prioritization may have other meanings, including the availability of data for output on client 210 so that the prioritized data is available to a user for viewing, hearing, etc. Prioritization may refer to hardware being allocated to data so that the data is made available to client 210 before non-prioritized data is available. Prioritization may refer to software allocation, such as a device driver in an operating system. The prioritization may be to different extents, namely blocking, partially blocking or temporarily blocking non-prioritized data until prioritized data reception is complete. The prioritization may refer to continual multiplexing between prioritized and non-prioritized data, with the prioritized data processed for a greater amount of time within a time period than non-prioritized data. Prioritization may refer to an amount of data processed with a higher amount, percentage, etc. of prioritized data processed (or processed within one or more time periods) than non-prioritized data. Prioritization may refer to a ratio of prioritized to non-prioritized data processed. Prioritization may include adding an additional channel of data dedicated temporarily for the prioritized data to an existing channel to create a bonded channel for providing unique data on two or more channels and/or a mirrored channel for duplicating data on more than one channel for redundancy, depending on the type of prioritization being performed. Other manners of prioritization are contemplated.

In a further embodiment, it may be determined that server 150, server 160 or both are transmitting streaming data. Thus, alternatively, at operation 248, if both servers are transmitting streaming data concurrently, data received from one server can be given priority over data received from another server(s). The priority may refer to outputting the data to a user via client 210, processing the data for output to a user via client 210, etc. The priority may be based on several factors such as which server is transmitting at a faster speed, which server has been predetermined to take priority over the other server, whether one server is transmitting in a format (e.g. TCP) that the other server is not (i.e., UDP), the amount of time that each server has been transmitting streaming data, the amount of data that each server is/will be transmitting, the likelihood that one server is sending streaming data vs. non-streaming data may be used as the basis to prioritize streaming data over non-streaming data, etc.

Operation 228 may be performed without performing operation 248, and operation 248 may be performed without performing operation 228. In an exemplary embodiment, streaming data is identified by packet header(s) or an amount of data transmitted in one or multiple time periods, both, or not both. Alternatively, both operation 228 and operation 248 are performed. In that situation, streaming data may be identified by just operation 228, just operation 248, or both. Operation 228 and operation 248 may be performed in parallel. Operation 228 may be performed before operation 248. Operation 248 may be performed before operation 228.

At operations 268 and 278, it is determined whether there is sufficient bandwidth for the data that is being transmitted to client 110. In other words, if server 150 is providing streaming data, and there is insufficient bandwidth for the streaming data that is provided by server 150, the streaming data output by client 110 may be subject to delays. Thus, in order to reduce or eliminate the delays, it may be desirable to increase the bandwidth at one or more locations over the path by which streaming data from server 150 is provided to client 110. This may be performed by bonding multiple channels to provide larger throughput to one server and to reduce network deficiencies (e.g., jitter, delay, latency, etc.) when communicating with the selected server and allocating fewer available resources and channels to the other server for a predefined period of time until the streaming session is deemed finished.

In one embodiment, operation 268 is performed to generate more bandwidth based on the knowledge of the bandwidth normally used by various types of streaming data. For example, audio is often streamed at 30 Kbps and video is often streamed at 30 frames per second (these numbers are just examples). When the Internet is not congested, it is possible to watch transmissions of audio, video, or other formats and to determine how much bandwidth is occupied when these respective formats are streamed. Put another way, it is possible to determine a desired transmission speed for streaming data. Once that desired transmission speed is known, the speed at which data is streamed to client 210 can be measured. If that speed is below the desired transmission speed, then two connections can be bonded to form bonded connections, which may result in the availability of greater bandwidth than may be available on a single connection. Furthermore, on a single connection, it may not be desirable to increase transmission speed of a plurality of data packets if increasing the transmission speed leads to undesirable results (unacceptable data error, unacceptable loss, unacceptable jitter, unacceptable latency, etc.).

Various types of streaming data may have respective desired transmission speeds (and require respectively different bandwidths). Video data, for example, uses greater bandwidth than audio data. Determining whether to provide bonded connections may be based on the bandwidth needs of the data being transmitted. For this reason, it may be desirable to determine not only that data is streaming data, but the type of data being streamed. It was explained above that various methods may be used to determine whether data is streaming data. Using the above methods, the type of data being streamed may also be determined. For example, certain ports, domain names, and/or IP addresses may be associated with not only streaming data, but with a type of data being streamed. The speed at which data is transmitted to (i.e., received by) client 210 may be a desirable rate based on the type of data being streamed. After determining the type of data being streamed, the rate that the data is being streamed can be compared with a previously determined desired transmission speed. If the actual rate of streaming is below the desired transmission speed, two (or more) connections may be bonded so there is greater (sufficient) bandwidth for the data streaming to occur at or above the desired transmission speed. The transmission speeds may also be stored in the table for reference purposes during such determinations and decision making required by the logic of the system network configuration.

For example, when client 210 is receiving streaming data, it is possible to measure how much bandwidth is being used. In one embodiment, this may be the amount of bandwidth that is being used in a data transmission in which errors do not occur (or errors occur below a threshold amount). The amount of bandwidth being used can be compared to the amount of bandwidth the type of streaming data normally uses when the Internet is not congested (see the above paragraph). If the amount of bandwidth being used is lower than the amount of bandwidth normally used for the type of data streaming, connections may be bonded to provide greater bandwidth. This is described in greater detail below.

Operation 268 may be performed in several different ways. In operation 268, a determination is made as to the maximum bandwidth that can be supported by a connection to client 110. When the word "maximum" is used, what is meant is the highest transmission speed without packets (or a threshold number of packets) being dropped and or latency being high. Thus, it may be acceptable for a predetermined number of packets to be dropped within a certain time. Alternatively, it may be acceptable for there to be a certain amount of latency. This threshold number can also be determined based on prior testing.

In other words, operation 268 may include a determination of how many packets can be sent before latency increases (and/or packets drop). Furthermore, in some embodiments, bandwidth can be calculated by dividing number of packets by latency, and then taking corrective action (bonding, mirroring, etc.) when a threshold is reached or exceeded.

Therefore, one way to determine this maximum bandwidth is to slowly increase transmission speed until one or more of several conditions occur, such as packets drop, a higher number of packets drop then is experimentally determined to be permissible, a higher number of packets drop then can be resent at a later time, the latency exceeds an amount either arbitrarily set, set by experiment, or set based on other statistics, etc.

In one embodiment, transmission speed of streaming data is increased (or is requested to be increased) as transmission speed increases. Transmission speed is increased and network characteristic statistics are monitored until one or more statistics become unacceptable, i.e. the statistic meets or exceeds a threshold. For example, transmission speed may be increased (or is requested to be increased) until error rate meets or exceeds an error rate threshold. All such measurement characteristics described in the example embodiments may be candidates for such thresholds and related actions based on the meeting, exceeding or underperforming of those thresholds.

In an alternative embodiment, maximum bandwidth may be determined using a third-party software product such as Speedtest by Ookla. The software product may measure the speed of a connection, and the measured speed may be compared to a threshold speed (or a threshold speed for the type of data being streamed). If the measured speed is below the threshold speed, then connection bonding may occur to add more channel connections to a single connection session.

Thus, for streaming data, various statistics are accumulated. The statistics may be packet loss, latency, jitter, etc. If any one or more of these statistics exceeds a predetermined amount, then at operation 288 the connection over which the streaming data has been transmitted is bonded with a further connection in order to increase bandwidth. Bonding two connections may also be accomplished using additional techniques that are known to one of ordinary skill in the art such as described in U.S. Pat. No. 7,006,500 which is incorporated herein by reference.

Operations 268 and 278 may be performed for streaming data or may be performed for non-streaming data. If operations 268 and 278 are performed for streaming data, the operations may be performed after operation 228, after operation 248, or after another operation is performed in order to determine whether receive data is streaming data. Furthermore, operation 278 may be performed either before or after operations 228 and/or 248.

At operation 290, the number of packets being dropped (and/or received with errors at their destination) within a time period is measured. If the number of packets being dropped (and/or received with errors) within a time period exceeds a threshold amount (operation 292), then at operation 294 two (or more) connections are provided with mirrored data (e.g., the same data is transmitted on two or more connections). In this manner, the chance of the data being received at its destination intact is increased. Operation 292 may be performed before or after operation 278.

Thus, various embodiments have been described in which a determination is made as to whether data is streaming, and if indeed the data is streaming then the data is prioritized over non-streaming data. Part of this determination may optionally include the operation of determining both whether data is streaming data and further data is non-streaming data. If client 110 is receiving data from two sources, and one of the two sources is transmitting streaming data, the received streaming data may be prioritized over the received non-streaming data in order to reduce or eliminate delays in the streaming data that is output by client 110. In this manner, the user experience is improved. Furthermore, if there is insufficient bandwidth for the streaming data, the connection over which the streaming data is transmitted may be bonded with a further connection so that increased bandwidth is realized.

Further, if data is being streamed, and a number of packets above a threshold amount are being dropped, the streaming data can be mirrored over multiple connections in order to increase the chances of streaming data being received at its destination.

The above explanation has included examples in which various operations are taken to improve streaming to a client such as mobile device. It is understood, however, that the above examples may relate to the streaming of data to other devices such as to a server.

Figure 4:
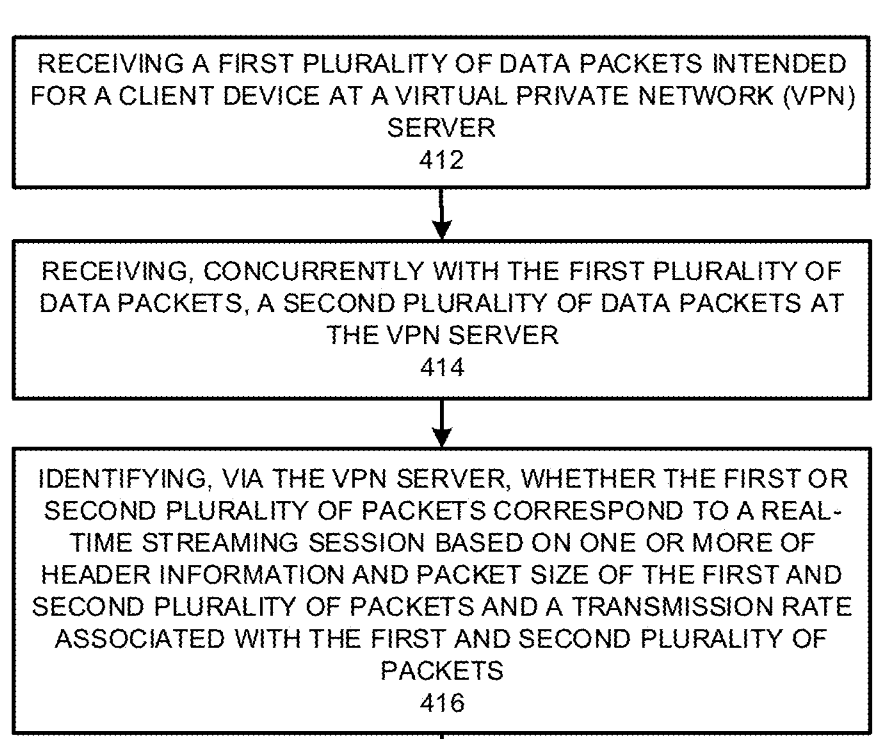
FIG. 4 is a block diagram that illustrates exemplary operation of a packet data management and prioritization according to example embodiments of the present invention.

FIG. 4 illustrates an example flow diagram of an example process for managing data packets according to example embodiments. Referring to FIG. 4, the process may include receiving a first plurality of data packets intended for a client device at a virtual private network (VPN) server 412 and receiving, concurrently with the first plurality of data packets, a second plurality of data packets at the VPN server 414. The packets may be received from one or more servers one or more of which may be sending real-time or delay sensitive data, such as streaming content. The process may also include identifying, via the VPN server, whether the first or second plurality of packets correspond to a real-time streaming session based on one or more of header information and packet size of the first and second plurality of packets and a transmission rate associated with the first and second plurality of packets 416. The header information of packets may be indicative of streaming or non-streaming data. Also, the packet sizes and data rates associated with the packets may be indicative of streaming packets. The data size of streaming packets tends to be similar in size and a threshold packet value can be used for identifying deviation beyond a certain size, which may be indicative of non-streaming data. The VPN performs prioritizing of the first plurality of data packets, identified as real-time streaming session data packets, to be delivered to the client device prior to the second plurality of data packets, identified as non-real-time streaming session data packets 418. In this example, the first data packets are considered real-time or streaming and the second are considered non-real-time or non-streaming. The process may also include performing connection bonding or connection mirroring using two or more connections when one or more of a data packet loss rate is above a threshold packet loss rate and the transmission rate is below a threshold transmission rate 422. The target rate may be desired to provide optimal streaming data content delivery, also, a packet loss rate may be necessary to ensure optimal streaming data content delivery.

The process may also include determining packet data sizes of at least a portion of the first plurality of data packets received over a period of time, determining whether the packet data sizes are within a margin of a target packet data size indicative of a streaming data packet, and identifying the first plurality of data packets as streaming data packets. In this example, a time period may be a finite window of time to measure, identify and determine whether the packets are being sent and received and are within a range of packet data sizes or are within a range of a target data rate. The process may also include determining a transmission rate of at least a portion of the first plurality of data packets received over a period of time, determining whether the transmission rate is within a margin of a target transmission rate indicative of streaming data packets, and identifying the first plurality of data packets as streaming data packets.

The example process may also include prioritizing the first plurality of data packets over the second plurality of data packets for delivery to the client device based on the header information of the one or more first plurality of data packets by identifying on one or more of a domain name, an IP address and a port identified in the header information. Such information may be stored in a table as being associated with one or more streaming servers. The information audited from the packets can then be compared to the table data to identify streaming vs. non-streaming packets. The process may also include auditing the first plurality of packets to identify the header information and the packet data size of the first plurality of packets for a plurality of separate time periods, determining whether the packet data size for each of the first plurality of packets for each of the separate time periods are indicative of streaming data packets, and performing the prioritization of the first plurality of packets when the first plurality of packets are identified as streaming data for each of the separate time periods. In this example, there may be 1, 2, 'N', time periods during which a packet audit is performed to identify characteristics of the packets over a period of time. Then, repeat the process multiple times for additional time periods and using the results of the audit for all time periods as an indication that the packets are in fact streaming packets or time sensitive real-time packets.

The process may also include selecting the first transmission rate for the first plurality of packets to be transmitted and received by the client device over one or more connections to reduce a likelihood of communication errors, determining whether the first plurality of data packets are transmitted and received over the one or more connections by the client device below a threshold packet loss rate, and combining the connection with a further connection to form the bonded connection when the first plurality of data packets are received above the threshold packet loss rate. At least one of the first plurality of data packets and the second plurality of data packets are transmitted over a Wi-Fi connection before the bonded connection is formed and over the Wi-Fi connection and a cellular connection after the bonded connection is formed comprising two or more connections. The decision to bond connections or channels may be predicated on whether the transmission rate and the loss rate are optimal or not. Also, when a bonded connection is established, the determination to remove the bonded connection after a predefined period of time may be based on whether the loss rate is now nominal or not. If so, the bonded connections can be removed and a single connection may be re-implemented. The transmission rate is incrementally increased to a faster optimal transmission rate on the bonded channel for a period of time until the packet loss rate decreases below the threshold packet loss rate, and when the packet loss rate decreases, a transmission rate of the cellular connection may be reduced and a transmission rate of the Wi-Fi connection may be maintained.

The process may also include selecting the transmission rate for the first plurality of packets to be received by the client device over a connection to reduce a likelihood of communication errors, determining whether the first plurality of data packets are received over the connection by the client device below a threshold packet loss rate, and combining the connection with a further connection to form the mirrored connection when the first plurality of data packets are received above the threshold packet loss rate. The process may also include populating a table stored in memory with streaming server identification information identifying a plurality of streaming servers, and comparing the header information of the first and second plurality of data packets to the streaming server identification information stored in the table to identify whether the first and second plurality of packets originated from one or more of the plurality of data streaming servers, wherein the transmitting the first plurality of data packets to the client device using the transmission rate is performed via the virtual private network (VPN) server, and the table is stored in the memory of the VPN server or the client device or both.

The above explanation has included multiple examples and multiple embodiments. It is understood to one of ordinary skill of the art that more than one of these examples and more than one of these embodiments can be combined in order to create further examples and embodiments. Also, disclosed features can be eliminated from various embodiments as desired. Also, some features of one embodiment may be combined with some features of another embodiment.

In an exemplary embodiment of the present invention a computer system may be included and/or operated within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a personal digital assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system includes a processing device, a main memory (e.g., read-only memory (ROM), flash memory, dynamic random access memory (DRAM) (such as synchronous DRAM (SDRAM) or Rambus DRAM (RDRAM), etc.), a static memory (e.g., flash memory, static random access memory (SRAM), etc.), and a data storage device, which communicate with each other via a bus.

Processing device represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device may also be one or more special-purpose processing devices such as an application specific integrated circuit (ASIC), a field programmable gate array (FPGA), a digital signal processor (DSP), network processor, or the like. Processing device is configured to execute listings manager logic for performing the operations and operations discussed herein.

Computer system may further include a network interface device. Computer system also may include a video display unit (e.g., a liquid crystal display (LCD) or a cathode ray tube (CRT)), an alphanumeric input device (e.g., a keyboard), a cursor control device (e.g., a mouse), and a signal generation device (e.g., a speaker).

Data storage device may include a machine-readable storage medium (or more specifically a computer-readable storage medium) having one or more sets of instructions embodying any one or more of the methodologies of functions described herein. Data storage may also reside, completely or at least partially, within main memory and/or within processing device during execution thereof by computer system; main memory and processing device also constituting machine-readable storage media.

Virtual private network (VPN) device/server may indicate any similar system that encapsulates packets to transmit them to and from a client device and to and from a remote server. For example, a VPN may be a software defined network (SDN) or SD wide area network (SD-WAN), or a multi-path TCP (MPTCP) proxy device.

Machine-readable storage medium may also be used to store the device queue manager logic persistently. While a non-transitory machine-readable storage medium is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instruction for execution by the machine and that causes the machine to perform any one or more of the methodologies of the present invention. The term "machine-readable storage medium" shall accordingly be taken to include, but not be limited to, solid-state memories, and optical and magnetic media.

The components and other features described herein can be implemented as discrete hardware components or integrated in the functionality of hardware components such as ASICs, FPGAs, DSPs or similar devices. In addition, these components can be implemented as firmware or functional circuitry within hardware devices. Further, these components can be implemented in any combination of hardware devices and software components.

Some portions of the detailed descriptions are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the aforementioned description, numerous details are set forth. It will be apparent, however, to one skilled in the art, that the disclosure may be practiced without these specific details. In some instances, well-known structures and devices are shown in block diagram form, rather than in detail, in order to avoid obscuring the disclosure.

The above explanation has included multiple examples and multiple embodiments. It is understood to one of ordinary skill of the art that more than one of these examples and more than one of these embodiments can be combined in order to create further examples and embodiments. Also, disclosed features can be eliminated from various embodiments as desired. Also, some features of one embodiment may be combined with some features of another embodiment.

Computer system may further include a network interface device. Computer system also may include a video display unit (e.g., a liquid crystal display (LCD) or a cathode ray tube (CRT)), an alphanumeric input device (e.g., a keyboard), a cursor control device (e.g., a mouse), and a signal generation device (e.g., a speaker).

A data storage device may include a machine-readable storage medium (or more specifically a computer-readable storage medium) having one or more sets of instructions embodying any one or more of the methodologies of functions described herein. The data storage may also reside, completely or at least partially, within main memory and/or within processing device during execution thereof by computer system; main memory and processing device also constituting machine-readable storage media.

Machine-readable storage medium may also be used to store the device queue manager logic persistently. While a non-transitory machine-readable storage medium is illustrated in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instruction for execution by the machine and that causes the machine to perform any one or more of the methodologies of the present invention. The term "machine-readable storage medium" shall accordingly be taken to include, but not be limited to, solid-state memories, and optical and magnetic media.

Figure 5:
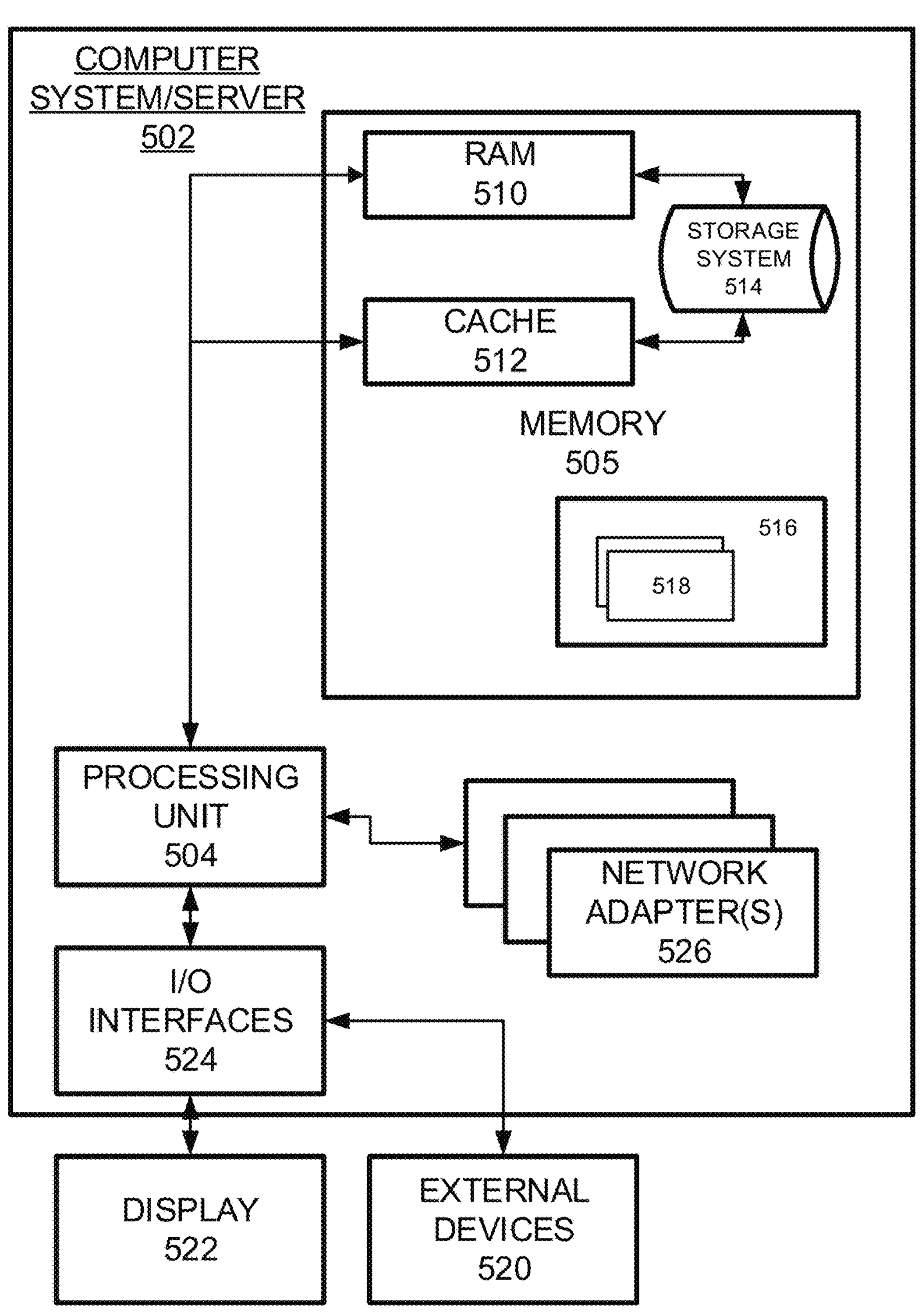
FIG. 5 illustrates a system configuration configured to perform one or more of the exemplary processes according to example embodiments of the present invention.

FIG. 5 is a computer readable medium and corresponding system configuration of an example device(s) configured to perform one or more operations associated with exemplary embodiments of the present invention.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

FIG. 5 illustrates an example network entity device configured to store instructions, software, and corresponding hardware for executing the same according to example embodiments. FIG. 5 is not intended to suggest any limitation as to the scope of use or functionality of embodiments of the application described herein. Regardless, the computing node 500 is capable of being implemented and/or performing any of the functionality set forth hereinabove.

In computing node 500 there is a computer system/server 502, which is operational with numerous other general purpose or special purpose computing system environments or configurations. Examples of well-known computing systems, environments, and/or configurations that may be suitable for use with computer system/server 502 include, but are not limited to, personal computer systems, server computer systems, thin clients, rich clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 502 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 502 may be practiced in distributed cloud computing environments where tasks are performed by remote processing devices that are linked through a communications network. In a distributed cloud computing environment, program modules may be located in both local and remote computer system storage media including memory storage devices.

As displayed in FIG. 5, computer system/server 502 in cloud computing node 500 is displayed in the form of a general-purpose computing device. The components of computer system/server 502 may include, but are not limited to, one or more processors or processing units 504, a system memory 506, and a bus that couples various system components including system memory 506 to processor 504.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 502 typically includes a variety of computer system readable media. Such media may be any available media that is accessible by computer system/server 502, and it includes both volatile and non-volatile media, removable and non-removable media. System memory 506, in one embodiment, implements the flow diagrams of the other figures. The system memory 506 can include computer system readable media in the form of volatile memory, such as random-access memory (RAM) 510 and/or cache memory 512. Computer system/server 502 may further include other removable/non-removable, volatile/non-volatile computer system storage media. By way of example only, storage system 514 can be provided for reading from and writing to a non-removable, non-volatile magnetic media (not displayed and typically called a "hard drive"). Although not displayed, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 506 may include at least one program product having a set (e.g., at least one) of program modules that are configured to carry out the functions of various embodiments of the application.

Program/utility 516, having a set (at least one) of program modules 518, may be stored in memory 506 by way of example, and not limitation, as well as an operating system, one or more application programs, other program modules, and program data. Each of the operating system, one or more application programs, other program modules, and program data or some combination thereof, may include an implementation of a networking environment. Program modules 518 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 502 may also communicate with one or more external devices 520 such as a keyboard, a pointing device, a display 522, etc.; one or more devices that enable a user to interact with computer system/server 502; and/or any devices (e.g., network card, modem, etc.) that enable computer system/server 502 to communicate with one or more other computing devices. Such communication can occur via I/O interfaces 524. Still yet, computer system/server 502 can communicate with one or more networks such as a local area network (LAN), a general wide area network (WAN), and/or a public network (e.g., the Internet) via network adapter(s) 526. As depicted, network adapter(s) 526 communicates with the other components of computer system/server 502 via a bus. It should be understood that although not displayed, other hardware and/or software components could be used in conjunction with computer system/server 502. Examples include, but are not limited to: microcode, device drivers, redundant processing units, external disk drive arrays, RAID systems, tape drives, and data archival storage systems, etc.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

The invention claimed is:

1. A method comprising:

prioritizing a first plurality of data packets identified as streaming session data packets, to be delivered to a client device prior to a second plurality of data packets, identified as non-streaming session data packets, wherein the prioritizing comprises processing the streaming session data packets more frequently and prior to processing of the non-streaming session data packets;

measuring a transmission rate of data streamed to the client device;

performing connection bonding using two or more connections when the measured transmission rate is below a target transmission rate;

increasing a transmission rate of the streaming session data packets to a faster transmission rate on the bonded connections for a period of time; and reducing a transmission rate of one connection of the two or more connections when a packet loss rate is determined to be below a threshold packet loss rate and maintaining a transmission rate of at least one other connection of the two or more connections.

2. The method of claim 1, comprising determining packet data sizes of at least a portion of the first plurality of data packets received;

determining whether the packet data sizes are within a margin of a target packet data size indicative of a streaming data packet; and identifying the first plurality of data packets as streaming data packets.

3. The method of claim 1, comprising determining whether the transmission rate of data streamed is within a margin of a target transmission rate indicative of streaming data packets; and identifying the first plurality of data packets as streaming data packets.

4. The method of claim 1, wherein the prioritizing the first plurality of data packets over the second plurality of data packets is based on header information of one or more of the first plurality of data packets comprising on one or more of a domain name, an IP address and a port identified in the header information.

5. The method of claim 1, comprising auditing the first plurality of packets to identify header information and a packet data size of the first plurality of packets for one or more time periods;

determining whether the packet data size for each of the first plurality of packets for each of the one or more time periods are indicative of streaming data packets; and performing the prioritization of the first plurality of packets when the first plurality of packets are identified as streaming data.

6. The method of claim 1, comprising determining whether the first plurality of data packets are transmitted and received over the one or more connections by the client device below the threshold packet loss rate; and forming the bonded connections responsive to the first plurality of data packets being received above the threshold packet loss rate.

7. The method of claim 1, wherein at least one of the first plurality of data packets and the second plurality of data packets are transmitted over a Wi-Fi connection before the bonded connection is formed and over the Wi-Fi connection and a cellular connection after the bonded connection is formed comprising the two or more connections.

8. The method of claim 7, wherein when the packet loss rate decreases, reducing a transmission rate of the cellular connection and maintaining a transmission rate of the Wi-Fi connection.

9. An apparatus comprising:

a processor configured to prioritize a first plurality of data packets identified as streaming session data packets, to be delivered to a client device prior to a second plurality of data packets, identified as non-streaming session data packets, wherein the prioritizing comprises processing the streaming session data packets more frequently and prior to processing of the non-streaming session data packets;

measure a transmission rate of data streamed to the client device;

perform connection bonding using two or more connections when the measured transmission rate is below a target transmission rate;

increase a transmission rate of the streaming session data packets to a faster transmission rate on the bonded connections for a period of time; and reduce a transmission rate of one connection of the two or more connections when a packet loss rate is determined to be below a threshold packet loss rate and maintain a transmission rate of at least one other connection of the two or more connections.

10. The apparatus of claim 9, wherein the processor is further configured to determine packet data sizes of at least a portion of the first plurality of data packets received;

determine whether the packet data sizes are within a margin of a target packet data size indicative of a streaming data packet; and identify the first plurality of data packets as streaming data packets.

11. The apparatus of claim 9, wherein the processor is further configured to determine whether the transmission rate of data streamed is within a margin of a target transmission rate indicative of streaming data packets; and identify the first plurality of data packets as streaming data packets.

12. The apparatus of claim 9, wherein the prioritization of the first plurality of data packets over the second plurality of data packets is based on header information of one or more of the first plurality of data packets comprising on one or more of a domain name, an IP address and a port identified in the header information.

13. The apparatus of claim 9, wherein the processor is further configured to audit the first plurality of packets to identify header information and a packet data size of the first plurality of packets for one or more time periods;

determine whether the packet data size for each of the first plurality of packets for each of the one or more time periods are indicative of streaming data packets; and perform the prioritization of the first plurality of packets when the first plurality of packets are identified as streaming data.

14. The apparatus of claim 9, wherein the processor is further configured to determine whether the first plurality of data packets are transmitted and received over the one or more connections by the client device below the threshold packet loss rate; and form the bonded connections responsive to the first plurality of data packets being received above the threshold packet loss rate.

15. The apparatus of claim 9, wherein at least one of the first plurality of data packets and the second plurality of data packets are transmitted over a Wi-Fi connection before the bonded connection is formed and over the Wi-Fi connection and a cellular connection after the bonded connection is formed comprising the two or more connections.

16. The apparatus of claim 15, wherein when the packet loss rate decreases, the processor reduces a transmission rate of the cellular connection and maintains a transmission rate of the Wi-Fi connection.

17. A non-transitory computer readable storage medium configured to store instructions that when executed causes a processor to perform:

prioritizing a first plurality of data packets identified as streaming session data packets, to be delivered to a client device prior to a second plurality of data packets, identified as non-streaming session data packets, wherein the prioritizing comprises processing the streaming session data packets more frequently and prior to processing of the non-streaming session data packets;

measuring a transmission rate of data streamed to the client device;

performing connection bonding using two or more connections when the measured transmission rate is below a target transmission rate;

increasing a transmission rate of the streaming session data packets to a faster transmission rate on the bonded connections for a period of time; and reducing a transmission rate of one connection of the two or more connections when a packet loss rate is determined to be below a threshold packet loss rate and maintaining a transmission rate of at least one other connection of the two or more connections.

18. The non-transitory computer readable storage medium of claim 17, wherein the processor is further configured to perform:

determining packet data sizes of at least a portion of the first plurality of data packets received;

determining whether the packet data sizes are within a margin of a target packet data size indicative of a streaming data packet; and identifying the first plurality of data packets as streaming data packets.

19. The non-transitory computer readable storage medium of claim 17, wherein the processor is further configured to perform:

determining whether the transmission rate of data streamed is within a margin of a target transmission rate indicative of streaming data packets; and identifying the first plurality of data packets as streaming data packets.

20. The non-transitory computer readable storage medium of claim 17, wherein the prioritizing the first plurality of data packets over the second plurality of data packets is based on header information of one or more of the first plurality of data packets comprising on one or more of a domain name, an IP address and a port identified in the header information.

* * * * *